United States Patent
Narendra Trivedi et al.

(10) Patent No.: US 10,068,068 B2
(45) Date of Patent: Sep. 4, 2018

(54) TRUSTED TIMER SERVICE

(71) Applicant: Intel Corporation, Santa Clara, CA (US)

(72) Inventors: Alpa T. Narendra Trivedi, Hillsboro, OR (US); Siddhartha Chhabra, Hillsboro, OR (US); Karanvir S. Grewal, Hillsboro, OR (US); David M. Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/395,399

(22) Filed: Dec. 30, 2016

(65) Prior Publication Data
US 2018/0189464 A1    Jul. 5, 2018

(51) Int. Cl.
*G06F 21/12* (2013.01)

(52) U.S. Cl.
CPC .... *G06F 21/126* (2013.01); *G06F 2221/0735* (2013.01)

(58) Field of Classification Search
CPC .......... G06F 21/126; G06F 2221/0735; G06F 17/30353; G06F 2201/835; H04L 2463/121; H04L 63/0281; H04L 2209/76; H04N 21/8547
See application file for complete search history.

(56) References Cited

U.S. PATENT DOCUMENTS

| | | | |
|---|---|---|---|
| 9,461,994 B2 | 10/2016 | Scott-Nash et al. | |
| 2006/0059574 A1* | 3/2006 | Fayad | G06F 21/76 726/34 |
| 2007/0110109 A1* | 5/2007 | Jennings | G06F 21/10 370/516 |
| 2009/0006862 A1* | 1/2009 | Alkove | G06F 21/10 713/189 |
| 2009/0083372 A1* | 3/2009 | Teppler | H04L 9/3226 709/203 |
| 2009/0293132 A1* | 11/2009 | Henry | G06F 21/72 726/27 |
| 2010/0011214 A1* | 1/2010 | Cha | G06F 21/725 713/175 |
| 2014/0095887 A1* | 4/2014 | Nayshtut | G06F 21/57 713/189 |
| 2015/0178481 A1 | 6/2015 | Chhabra et al. | |
| 2017/0111459 A1* | 4/2017 | Fisher | H04L 67/18 |

OTHER PUBLICATIONS

Pires et al., "Secure Content-Based Routing Using Intel Software Guard Extensions", Dec. 12-16, 2016, ACM, pp. 1-10.*

* cited by examiner

*Primary Examiner* — Matthew Smithers
(74) *Attorney, Agent, or Firm* — Trop, Pruner & Hu, P.C.

(57) ABSTRACT

A trusted time service is provided that can detect resets of a real-time clock and re-initialize the real-time clock with the correct time. The trusted time service provides a secure communication channel from an application requesting a timestamp to the real-time clock, so that malicious code (such as a compromised operating system) cannot intercept a timestamp as it is communicated from the real-time clock to the application. The trusted time service synchronizes wall-clock time with a trusted time server, as well as protects against replay attacks, where a valid data transmission (such as transmission of a valid timestamp) is maliciously or fraudulently repeated or delayed.

17 Claims, 10 Drawing Sheets though the computing device with which it is associated is disconnected from a power source or operating in a sleep state. The trusted time service provides a secure communication channel from an application requesting a timestamp to the real-time clock, so that malicious code (such as a compromised operating system) cannot intercept a timestamp as it is communicated from the real-time clock to the application. In addition, the trusted time service synchronizes wall-clock time with a trusted time server. Finally, the trusted time service protects against replay attacks, where a valid data transmission (such as transmission of a valid timestamp) is maliciously or fraudulently repeated or delayed.

TRUSTED TIMER SERVICE

TECHNICAL FIELD

Techniques are disclosed that are related to computer security, and in particular, to protection of computer-generated timestamps.

BACKGROUND

Digital timestamps record date and time information and may be attached to digital data. For example, computer files contain timestamps that tell when the file was last modified, and digital cameras add timestamps to the pictures they take, recording the date and time the picture was taken. Computers use digital timestamps to control access to licensed media content, such as a movie. When an application begins playing the movie, the application may request a timestamp from a hardware real time clock to monitor when the license expires so that the licensed media content is not available beyond expiration of the license. An attacker can cause the real time clock to be reset before the license associated with the media content expires and thereby bypass the license to obtain unlimited access to the media content.

DETAILED DESCRIPTION

Figure 1:
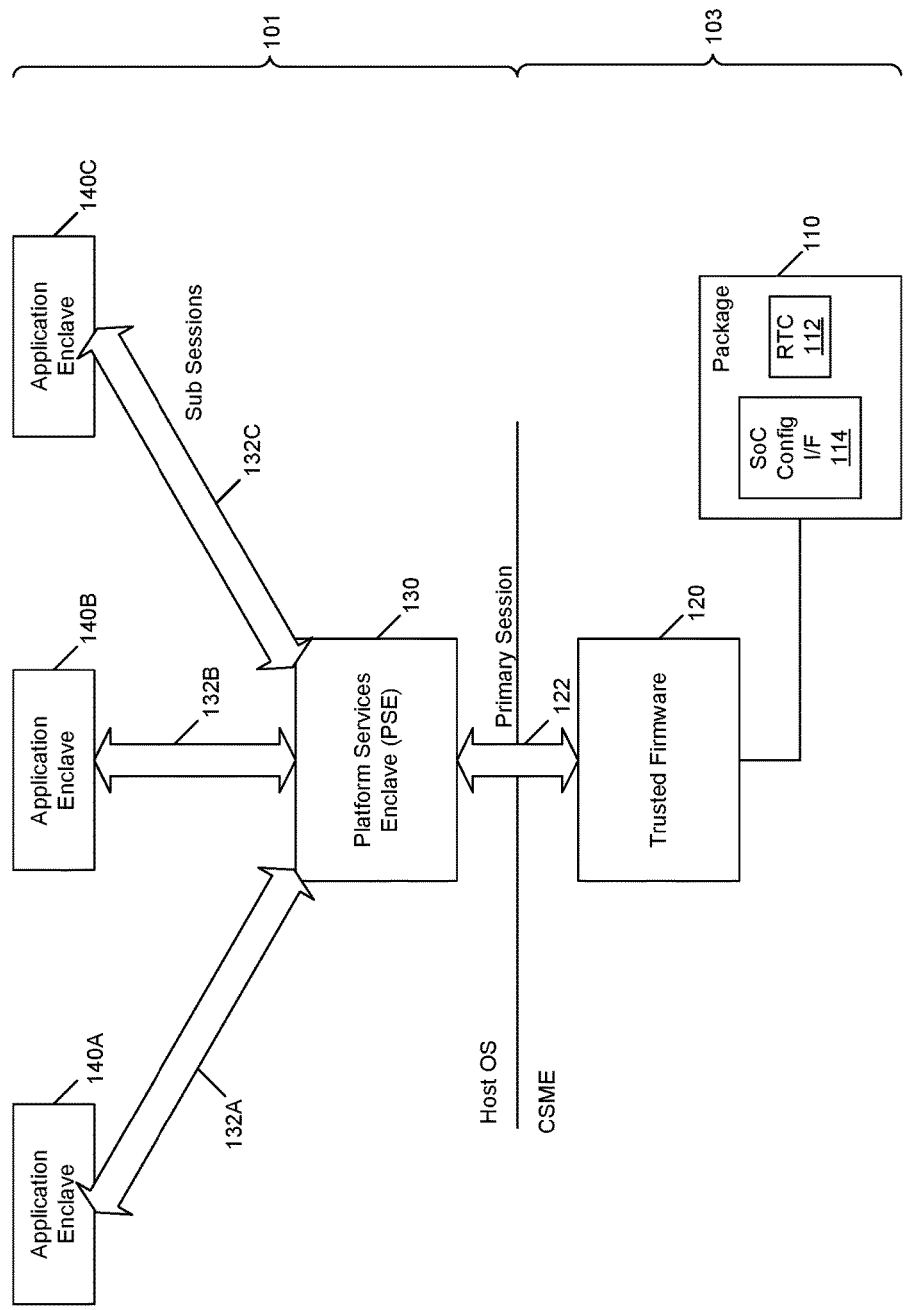
FIG. 1 is a block diagram of a computing device implementing a trusted time service.

The present disclosure provides a trusted time service that can detect resets of a real-time clock and re-initialize the real-time clock with the correct time. The trusted time service may be based upon a real-time clock with a battery backup, so that the real-time clock tracks time even though the computing device with which it is associated is disconnected from a power source or operating in a sleep state. The trusted time service provides a secure communication channel from an application requesting a timestamp to the real-time clock, so that malicious code (such as a compromised operating system) cannot intercept a timestamp as it is communicated from the real-time clock to the application. In addition, the trusted time service synchronizes wall-clock time with a trusted time server. Finally, the trusted time service protects against replay attacks, where a valid data transmission (such as transmission of a valid timestamp) is maliciously or fraudulently repeated or delayed.

The technologies of the present disclosure utilize one or more secure enclaves (also referred to herein as a "memory enclave" or simply, an "enclave") to provide a trusted time service for a computing device. Secure enclaves may be embodied as regions of memory including software that are isolated from other software executed by a processor of the computing device. In general, a secure enclave is made up of at least one memory page that has a different access policy than the access policy imposed by traditional ring boundaries of a computing device. The memory page(s) within a secure enclave may have associated read/write controls which may be configured such that the read/write controls have exclusivity over certain operating modes or privilege "rings", system management mode or virtual machine monitors of an associated processor. A secure enclave may therefore be designed to provide a sheltered place to host and execute trusted code, data, and the like, such that the secure enclave may be protected from other software on a client, including application software and privileged software such as an operating system, a virtual machine monitor, combinations thereof, and the like. Without limitation, suitable secure enclaves include those that may be provided using Intel® Software Guard Extensions (SGX) technology. Intel® SGX technology may be embodied as a set of processor instruction extensions that allow a processor to establish one or more secure enclaves in a memory. Of course, other suitable memory enclave technologies may be used.

Reference is now made to the drawings, wherein like reference numerals are used to refer to like elements throughout. It is noted that for the purpose of clarity and ease of understanding, the following description focuses on the use of secure enclaves to provide a trusted time service in particular use cases. Although numerous details with regard to those use cases may be provided, it should be understood that the technologies described herein can be practiced in other contexts, potentially without some or all of the details provided with regard to the specific use cases described herein. It is also noted that for the sake of clarity, well known structures and devices are shown in block diagram form. The intention is to cover all modifications, equivalents, and alternatives within the scope of the appended claims.

FIG. 1 shows an example of an implementation of a trusted time service. In this implementation, the trusted time service is provided as an Intel® Software Guard Extensions (SGX) platform service using secure enclaves technology. An application running within a secure enclave called an "application enclave," such as one of application enclaves 140A, 140B, or 140C. Each application enclave can request a trusted timestamp, for example, in the context of a content licensing flow, as described above. The SGX platform trusted time service provides a platform services enclave (PSE) 130, which retrieves the timestamp from a hardware real-time clock (RTC) 112. In the example shown in FIG. 1, the platform services enclave (PSE) 130 uses converged security management engine (CSME) 103 to provide a secure communication channel to hardware such as real-time clock (RTC) 112.

As background information regarding converged security manageability engine (CSME) 103, the Converged Security and Manageability Engine (CSME) powers the Intel® Active Management Technology (AMT) system. Platforms equipped with Intel® AMT can be managed remotely, regardless of the platform's power state or whether an operating system is functioning on the platform. The CSME refers to the hardware features that operate at the baseboard level, below the operating system. By enabling interaction with low-level hardware, CSME provides administrators with the ability to perform tasks that previously required someone to be physically present at the desktop. In addition, CSME provides an interface by which a trusted timestamp can be retrieved from real-time clock (RTC) 112.

In the context of FIG. 1, converged security manageability engine (CSME) 103 provides trusted firmware 120, which communicates directly with hardware such as package 110. Package 110 includes real-time clock (RTC) 112 and an SoC configuration interface 114. To securely communicate with real-time clock (RTC) 112, platform services enclave (PSE) 130 establishes a secure communication channel 122 with trusted firmware 120 of converged security and manageabilty engine (CSME) 103. Secure communication channel 122 provides a trusted channel to communicate between a secure enclave, such as platform services enclave (PSE) 130, running under a host operating system 401 in user mode and hardware such as real-time clock (RTC) 112. In this implementation, platform services enclave (PSE) 130 provides the only communication channel between an application running in an application enclave 140A, 140B or 140C and hardware such as real-time clock (RTC) 112. This secure communication channel 122 can be used to support multiple applications, which share the secure communication channel to hardware. For example, each of application enclaves 140A, 140B, and 140C communicates with platform services enclave (PSE) 130 via a respective one of channel sub-sessions 132A, 132B, or 132C. Each of channel sub-sessions 132A, 132B, and 123C is a sub-session of the primary session provided by secure communication channel 122 established between platform services enclave (PSE) 130 and trusted firmware 120.

In the implementation described above, the SGX trusted time platform service relies on Intel's Converged Security and Manageability Engine (CSME) to deliver the timestamp from the real-time clock to the SGX platform service to avoid passing through software vulnerable to tampering. This implementation causes source code for the CSME to be in the SGX Trusted Computing Base (TCB) while the trusted time service is active.

Modern computing systems strive to reduce the size of the TCB so that an exhaustive examination of the trusted code base (by means of manual or computer-assisted software audit or program verification) becomes feasible. The validation that occurs as each component of the TCB is loaded into memory is time- and resource-intensive, and it is desirable to reduce the size of the TCB that must be measured. Furthermore, the smaller the TCB, the less likely an opportunity will arise for an attacker to find vulnerability in the code making up the TCB. An alternative to using a CSME to provide a trusted time platform service is therefore desirable.

In addition, CSME has a firmware component that may be exposed to an Original Equipment Manufacturer (OEM) operating system in the future. With the source code of the SGX platform service extended to include OEM-written firmware, the TCB of the SGX trusted time platform service would be significantly increased.

The present disclosure provides a novel scheme for a secure enclave to obtain a trusted time stamp without increasing the TCB for the trusted time platform service. A trusted time platform service implemented as described in the present disclosure provides the same robustness guarantees as the CSME and at the same time reduces the TCB by excluding code for the CSME.

Figure 2:
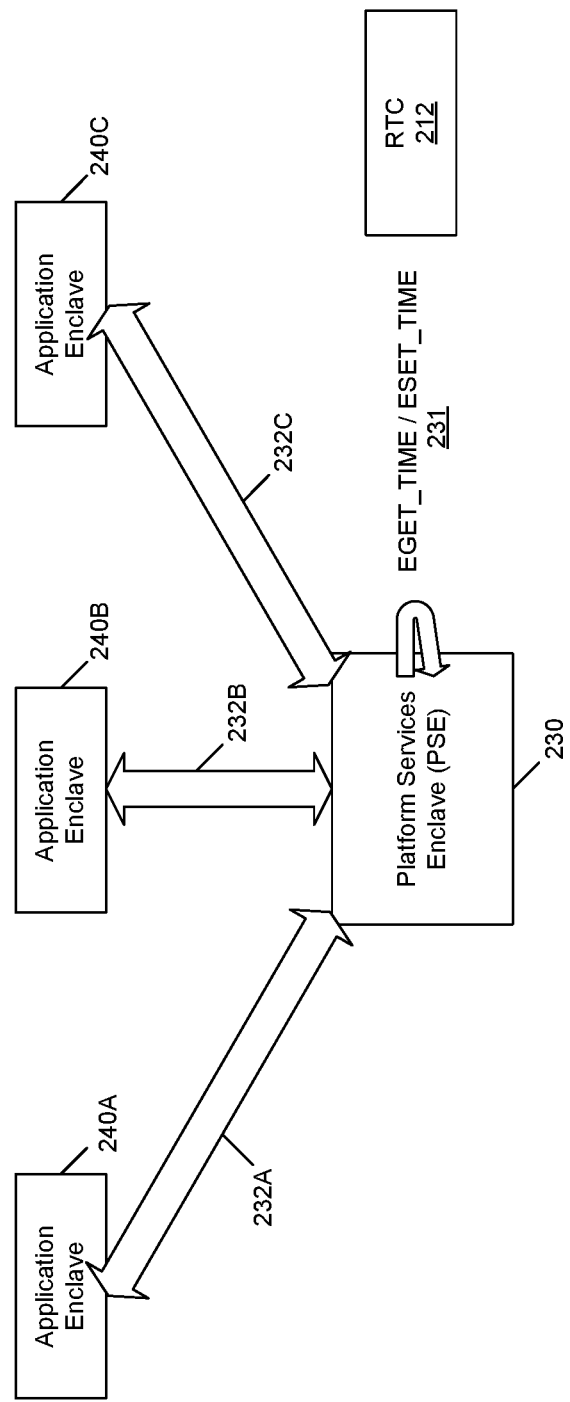
FIG. 2 is a block diagram of a computing device implementing a trusted time service in accordance with an embodiment described in the present disclosure.

Referring to FIG. 2, a block diagram of a computing environment for implementing a trusted time service is shown. Similar to FIG. 1, an application (not shown) runs within a secure enclave called an "application enclave," such as one of application enclaves 240A, 240B, or 240C. Each application enclave can request a trusted timestamp, for example, in the context of a content licensing flow, as described above. The SGX platform trusted time service provides a platform services enclave (PSE) 230, which retrieves the timestamp from a hardware real-time clock (RTC) 212. In the example shown in FIG. 2, no intermediary (such as CSME 103 of FIG. 1) is used between platform services enclave (PSE) 230 and hardware such as real-time clock (RTC) 212.

Platform services enclave (PSE) 230 directly issues an instruction to real-time clock (RTC) 212 and receives a timestamp in response to the instruction. In one embodiment, the instruction is an EGET_TIME instruction, which is described in further detail below. No code outside of platform services enclave (PSE) 230 is executed to obtain the trusted timestamp. Because only trusted code executing within a secure enclave is used to obtain the trusted timestamp, real-time clock (RTC) 212 can be described as an enclave-exclusive, or SGX-exclusive, hardware endpoint.

Upon receiving the trusted timestamp from real-time clock (RTC) 212, platform services enclave (PSE) 230 delivers the trusted timestamp to the requesting application enclave 240A, 240B, or 240C via a trusted communication channel between secure enclaves, such as one of secure communication channels 232A, 232B, or 232C. Because no code outside of the secure enclaves is executed to obtain or deliver the trusted timestamp, the Trusted Computing Base (TCB) of the trusted time stamp service is limited to the trusted code provided within a secure enclave.

In one embodiment, only a platform services enclave (PSE), such as PSE 230, is allowed to execute the EGET_TIME and ESET_TIME instructions. For example, an application enclave 240A, 240B or 240C cannot execute the EGET_TIME and ESET_TIME instructions, but instead must obtain a trusted timestamp via platform services enclave (PSE) 230.

In one embodiment, each enclave is associated with a set of attribute bits that are set when the enclave is created. These attribute bits include a bit that indicates whether the enclave is a platform services enclave (PSE). When invoked, the EGET/SET_TIME instructions retrieve the attributes associated with the calling enclave and check to ensure that the attribute bit for the calling enclave indicates that the enclave is the platform services enclave (PSE).

The attribute bit identifying the calling platform services enclave is useful in several situations. For example, in case of dual-boot operating systems, two platform services enclaves may be active at a given point. An attribute bit identifying the calling platform services enclave making the request to read/write to the hardware can be used for access-control enforcement in the hardware. In addition, the time-related registers stored in hardware must be programmed via the associated platform services enclave (PSE).

In one embodiment, platform services enclave (PSE) 230 detects a reset of real-time clock (RTC) 212 and can re-initialize real-time clock (RTC) 212 to the correct time.

Platform services enclave (PSE) 230 also synchronizes wall-clock time with a trusted time server to ensure that the correct time is used to initialize real-time clock (RTC) 212 time-related registers.

In one embodiment, platform services enclave (PSE) 230 generates an epoch value (e.g., a 32-bit random number) on every real-time clock reset and during real-time clock initialization. The epoch value is used to generate a time-nonce that is returned along with the timestamp to the requesting application enclave to indicate whether a real-time clock reset has occurred.

Figure 3:
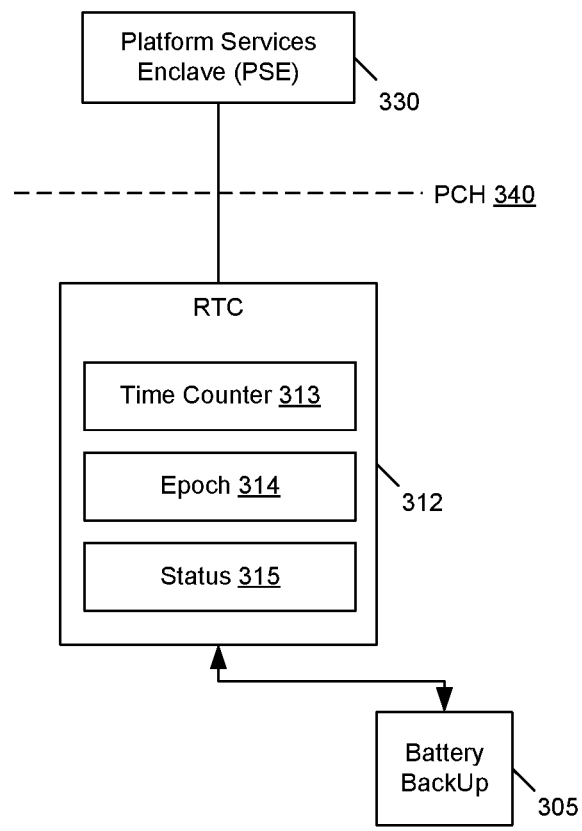
FIG. 3 is a block diagram of a real-time clock hardware endpoint configured with time registers for providing a timestamp to a trusted time service in accordance with an embodiment described in the present disclosure.

FIG. 3 is a block diagram of a real-time clock (RTC) hardware endpoint 312 configured with time registers for providing a timestamp to a trusted time service. In one embodiment, RTC hardware endpoint 312 is configured so that the real-time clock (RTC) hardware can only be accessed by processor microcode that implements an instruction set with time-related instructions similar to those described herein, such as EGET_TIME and ESET_TIME. Such a hardware endpoint is referred to as a "microcode-exclusive hardware endpoint" or "ucode-exclusive hardware endpoint." In the Intel® SGX framework, a microcode-exclusive hardware endpoint may be referred to as an "SGX-exclusive hardware endpoint" or, in the situation where the hardware endpoint can only be accessed via a secure enclave, an "enclave-exclusive hardware endpoint."

In RTC hardware endpoint 312, the registers within the RTC are accessible only via the instructions. Other real-time clock (RTC) implementations that use a Converged Security and Manageability Engine (CSME) to access the RTC include code for the CSME in the Trusted Computing Base and cannot use the microcode-exclusive instructions to access the RTC.

Real-time clock (RTC) hardware endpoint 312 includes a time counter register 313, a time epoch register 314, and a status register 315. Battery backup unit 305 provides a battery backup for RTC hardware endpoint 312. Battery backup unit 305 enables RTC hardware endpoint 312 to maintain the current time and register values even if the computing device is powered off or in a sleep state. Battery backup unit 305 enables real-time clock hardware endpoint 312 time counter register 313 to count seconds even if the battery of the computing device is removed in an attempt to reset the real-time clock.

Platform services enclave (PSE) 330 securely accesses real-time clock (RTC) 312 via a platform controller hub (PCH) 340. Platform controller hub (PCH) 340 is a set of microchips that provides a data path for communicating instructions such as EGET_TIME and ESET_TIME from platform services enclave (PSE) to real-time clock (RTC) 312.

Real-time clock (RTC) hardware endpoint 312 exposes a set of configuration registers for each platform services enclave (PSE), such as platform services enclave 330, executing on the computing device. Each of these configuration registers, including time counter register 313, time epoch register 314, and status register 315, is described in further detail below.

Time counter register 313 is the secure timestamp register. The timestamp is incremented every second and hence the error rate will be +/−1 second.

In one embodiment, time counter register 313 is configured as indicated in Table 1 below.

TABLE 1

Real-time Clock Counter Register

| Bit | Type | Reset | Description |
|---|---|---|---|
| [31:0] | RW | 00000000h | This register provides read and write access to the RTC clock counter. Upon coming out of reset, the counter is a free-running counter clocked with the RTC-well version of the 1-second clock tick. When PSE writes to this register, the 32-bit register value is loaded into the counter. The counter is restarting from the new value. When PSE reads this register, hardware returns the current counter value. Note: The timer has an error rate of +/−1 tick (1 second) |

Time epoch register 314 stores the time epoch value and is updated upon a real-time clock reset or as part of real-time clock initialization. In one embodiment, time epoch register 314 is configured as indicated in Table 2 below.

TABLE 2

Real-time Clock Time Epoch Register

| Bit | Type | Reset | Description |
|---|---|---|---|
| [31:0] | RW | 00000000h | This register contains a platform services enclave (PSE) generated value that is updated on every reset of the real-time clock. |

Status register 315 indicates whether the real-time clock has been initialized and/or whether a reset of the real-time clock occurred.

TABLE 3

Real-time Clock Status Register

| Bit | Type | Reset | Description |
|---|---|---|---|
| [0] | RW | 0 | RTC Initialization Done (RTC_ID) bit. This bit is set to '1' by platform services enclave (PSE) as part of the real-time clock initialization sequence. If there is a battery power loss, the bit is reset to '0'. |
| [31:1] | R | 00000000h | Reserved. |

In one embodiment, platform services enclave (PSE) 330 initializes real-time clock (RTC) hardware endpoint 312 with a current timestamp. Real-time clock (RTC) hardware endpoint 312 may be initialized when platform services enclave (PSE) 330 receives a first-time request from an application enclave or as part of a real-time clock (RTC) reset operation. As part of the initialization of real-time clock (RTC) hardware endpoint 312, in one embodiment, platform services enclave (PSE) 330 synchronizes wall-clock time from a trusted time server to obtain a current timestamp from which time counter register 313 will begin counting. Platform services enclave (PSE) 330 may also generate a new 32-bit random number as an epoch value for initializing time epoch register 314. Platform services enclave (PSE) 330 may also set the status register 315

RTC_ID bit to indicate that the real-time clock (RTC) 312 initialization is complete. In one embodiment, platform services enclave (PSE) 330 executes an ESET_TIME instruction to program the real-time clock (RTC) 312 registers, including time counter register 313, time epoch register 314, and status register 315.

Platform services enclave (PSE) 330 may also detect a reset of real-time clock (RTC) hardware endpoint 312, which may indicate malicious tampering with the real-time clock (RTC) 312. For example, an attacker can remove the battery of the computing device to cause a power loss and hence reset the time counter to extend the availability of licensed content beyond the license expiration period. To indicate a reset of the real-time clock (RTC) 312, status register 315 may be used.

In one embodiment, status register 315 of the real-time clock (RTC) hardware endpoint 312 contains a hardware RTC_ID "sticky-bit" as described with reference to Table 3 above. The RTC_ID bit is set by a platform services enclave (PSE) 330 currently associated with real-time clock (RTC) 312. The RTC_ID bit is reset to '0' for when a power loss occurs of the real-time clock (RTC) 312. When platform services enclave (PSE) 330 executes an EGET_TIME instruction as part of a trusted time request, platform services enclave (PSE) 330 reads the status register 315 RTC_ID bit. If the RTC_ID bit is reset to a value of '0,' platform services enclave (PSE) generates a new epoch value (e.g., a 32-bit random number) that is used to generate a time-nonce to indicate a reset of real-time clock (RTC) 312. Platform services enclave (PSE) 330 may also trigger a RTC-initialization sequence to program the real-time clock (RTC) 312 time counter register 313 with the wall-clock time, program the time epoch register 314 with the new epoch value, and set the RTC_ID bit of status register 315.

Details about the instructions used by a platform services enclave (PSE) are provided below. The EGET_TIME instruction allows a specific enclave to read the trusted timestamp from an enclave-exclusive hardware endpoint and the ESET_TIME instruction allows a specific enclave to initialize and program the trusted timestamp in the hardware endpoint.

The EGET_TIME instruction is a ring-3 instruction that can be executed by application programs running under control of an operating system, such as applications running within a secure enclave. The EGET_TIME instruction allows a platform services enclave (PSE) to read the secure timestamp, time epoch value, and status bits from the real-time clock (RTC) registers in hardware. Parameters of the EGET_TIME instruction include the following:
  DS:ECX: Timestamp <32b read return value>
  DS:EBX: Status <1b read return value>
  DS:EDX: EPOCH <32b read return value>.
  Execution of the EGET_TIME instruction conducts the following operations:
  <<Read the Time counter (32b) register in RTC in hardware>>
  <<Read the RTC status (32b) register in RTC in hardware>>
  Return <timestamp (32b), status (1b), epoch(32b)> to the PSE The ESET_TIME instruction is also a ring-3 instruction that can be executed by application programs running under control of an operating system, such as applications running within a secure enclave. The ESET_TIME instruction allows a platform services enclave (PSE) to initialize the time counter register in hardware.

Parameters of the ESET_TIME instruction include the following:
  DS:ECX: Timestamp <32b wr_data>
  DS:EBX: Status <1b wr_data>
  DS:EAX: EPOCH <32b wr_data>.
  Execution of the ESET_TIME instruction conducts the following operations:
  <<Initialize the Time counter (32b) register in RTC with wr_data>>
  <<Initialize the Epoch (32b) register in RTC with wr_data>>
  <<Initialize the RTC Status (1b) register in RTC with wr_data >>

Figure 4:
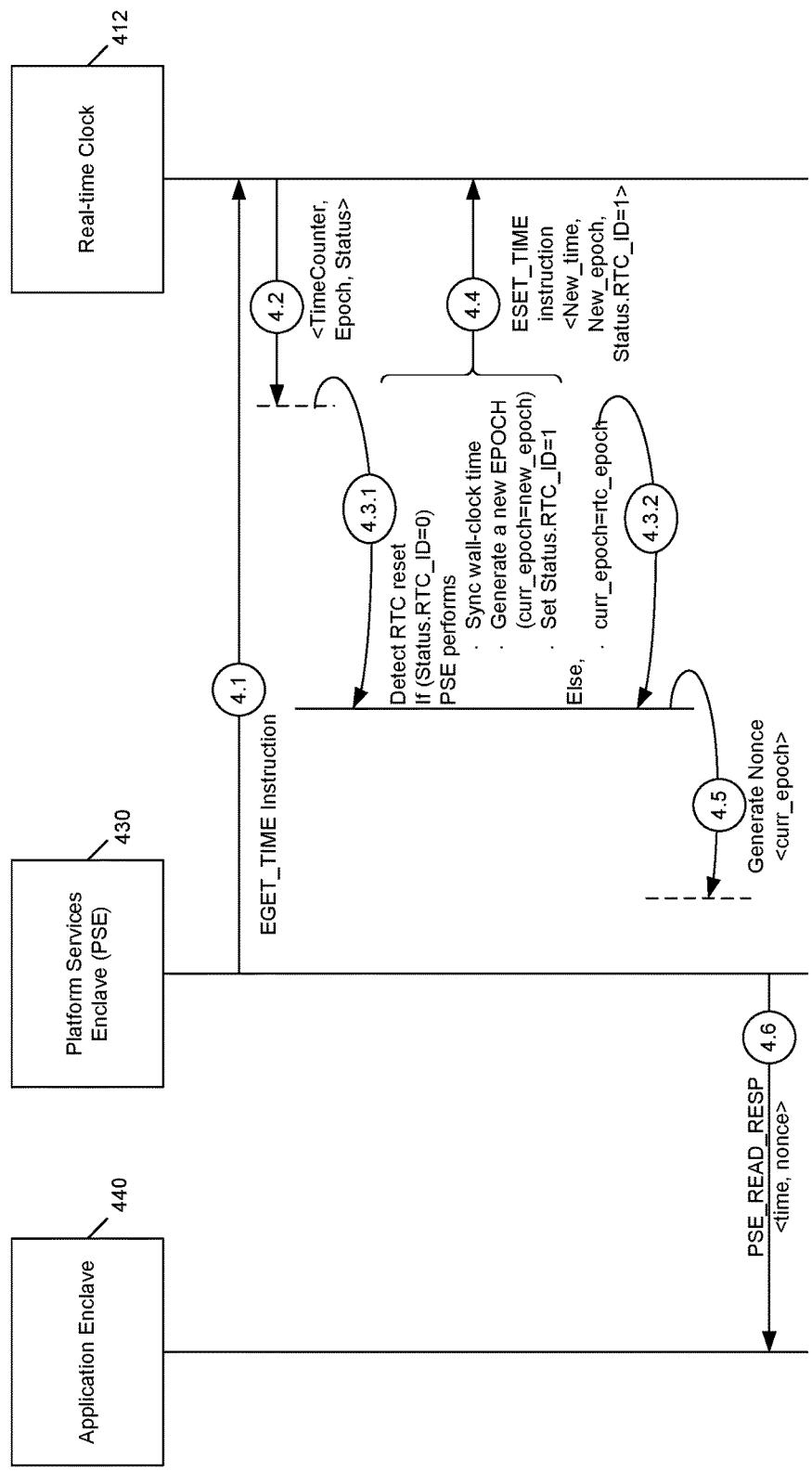
FIG. 4 is a sequence diagram showing activities performed by a platform services enclave (PSE) in providing a trusted time service in accordance with an embodiment described in the present disclosure.

FIG. 4 is a sequence diagram showing activities performed by a platform services enclave (PSE) 430 in providing a trusted time service to an application (not shown) running in an application enclave 440. In FIG. 4, platform services enclave (PSE) 430 determines whether a reset of real-time clock (RTC) 412 has occurred and communicates the correct time to an application enclave 440. For example, application enclave 440 may request a current timestamp, and the request is directed to platform services enclave (PSE) 430. In one embodiment, an SGX application enclave, such as application enclave 440, makes a request to get a trusted time stamp by invoking a GET_TIME API exposed via a SGX trusted library (tPSE.lib).

In action 4.1, platform services enclave (PSE) 430 requests a current timestamp from real-time clock (RTC) 412 by issuing an EGET_TIME instruction. In action 4.2, a return value tuple <TimeCounter, Epoch, Status> from the EGET_TIME instruction is received by platform services enclave (PSE) 430. In action 4.3.1, platform services enclave (PSE) 430 determines whether a reset of real-time clock (RTC) 412 has occurred. If a reset of the real-time clock (RTC) 412 has occurred, as indicated by the status register's RTC_ID bit set to a value of '0,' at action 4.3.1, platform services enclave (PSE) 430 synchronizes the wall-clock time with a trusted time server; generates a new epoch value and assigns a curr_epoch variable to the value of the new_epoch variable; and sets the status register's RTC_ID bit to a value of '1.' Control then proceeds to action 4.4.

In action 4.4, platform services enclave (PSE) 430 issues an ESET_TIME instruction to real-time clock (RTC) 412, providing a new timestamp from which the time counter register is to begin counting, a new epoch value, and an RTC_ID bit having a value of '1' for the real-time clock 412 status register. Control proceeds to action 4.5, where platform services enclave (PSE) 430 generates a nonce based upon the current epoch value. In action 4.6, platform services enclave (PSE) 430 returns a response to the time request issued by application enclave 440 in action 4.1. The response includes a current timestamp and the nonce generated in action 4.5.

At action 4.2, if the status register's RTC_ID bit returned a value of '1,' the real-time clock (RTC) 412 has not been reset and the detection of a reset of the real-time clock (RTC) 412 has failed the test at action 4.3.1. Control proceeds to action 4.3.2, where platform services enclave (PSE) 430 assigns a curr_epoch variable to the value of the epoch variable returned by real-time clock (RTC) 412. From action 4.3.2, control proceeds to actions 4.5 and 4.6, as described above.

Figure 5:
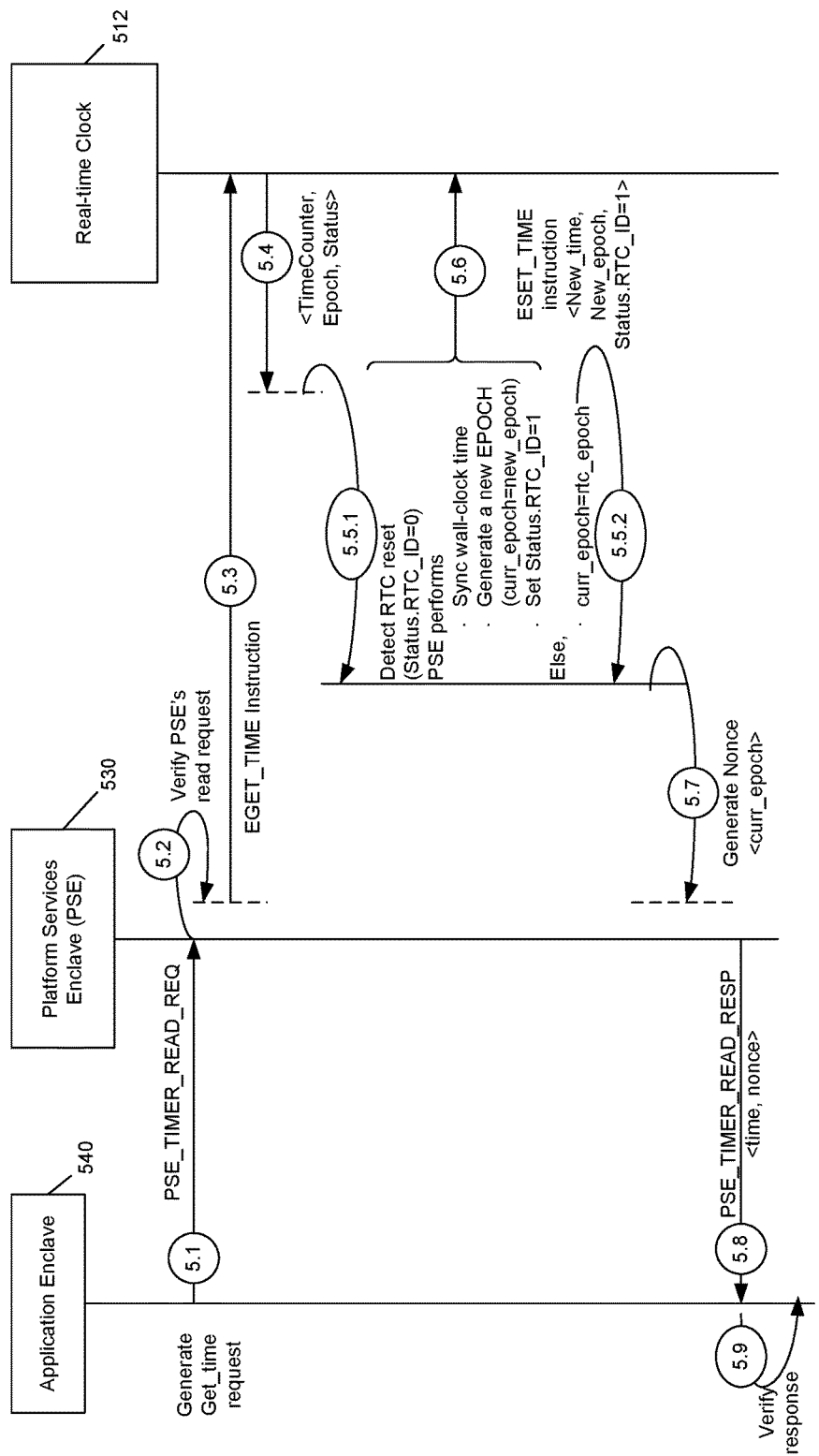
FIG. 5 is another sequence diagram showing activities performed by a platform services enclave (PSE) in providing a trusted time service in accordance with an embodiment described in the present disclosure.

Referring to FIG. 5, platform services enclave (PSE) 530 services a time request from an application enclave 540 and communicates the correct time to application enclave 540. In action 5.1, application enclave 540 generates a time request and requests a current timestamp, such as by invoking a GET_TIME API as described above with reference to FIG. 4. In one embodiment, the time request is routed from application enclave 540 to platform services enclave (PSE) 530 via a trusted channel (not shown) between application enclave 540 and platform services enclave (PSE) 530. Because requests and responses between application enclave 540 and platform services enclave (PSE) 530 are communicated via a trusted channel, requests and responses are verified as part of standard enclave-to-enclave communication in, for example, the Intel® Software Guard Extensions (SGX) framework.

In action 5.2, platform services enclave (PSE) 530 verifies the application enclave 540's request. In action 5.3, platform services enclave (PSE) 530 then requests a current timestamp from real-time clock (RTC) 512 by issuing an EGET_TIME instruction. In action 5.4, a return value tuple <TimeCounter, Epoch, Status> from the EGET_TIME instruction is received by platform services enclave (PSE) 530. In action 5.5.1, platform services enclave (PSE) 530 determines whether a reset of real-time clock (RTC) 512 has occurred. If a reset of the real-time clock (RTC) 512 has occurred, as indicated by the status register's RTC_ID bit set to a value of '0' at action 5.5.1, platform services enclave (PSE) 530 synchronizes the wall-clock time with a trusted time server; generates a new epoch value and assigns a curr_epoch variable to the value of the new_epoch variable; and sets the status register's RTC_ID bit to a value of '1.' Control then proceeds from action 5.5.1 to action 5.6, where platform services enclave (PSE) 430 issues an ESET_TIME instruction to real-time clock (RTC) 512. The ESET_TIME instruction provides a new timestamp from which the time counter register is to begin counting, a new epoch value, and an RTC_ID bit having a value of '1' for the real-time clock 512 status register. Control proceeds from action 5.6 to action 5.7, where platform services enclave (PSE) 530 generates a nonce based upon the current epoch value. In action 5.8, platform services enclave (PSE) 530 returns a response to the time request issued by application enclave 540 in action 5.1. The response includes a current timestamp and the nonce generated in action 5.7. In action 5.9, application enclave 540 verifies the response.

At action 5.5.1, if the status register's RTC_ID bit returned a value of '1,' the real-time clock (RTC) 512 has not been reset. In action 5.5.2, platform services enclave (PSE) 530 assigns a curr_epoch variable to the value of the epoch variable returned by real-time clock (RTC) 512. Control then proceeds to action 5.7, which was described above.

Figure 6:
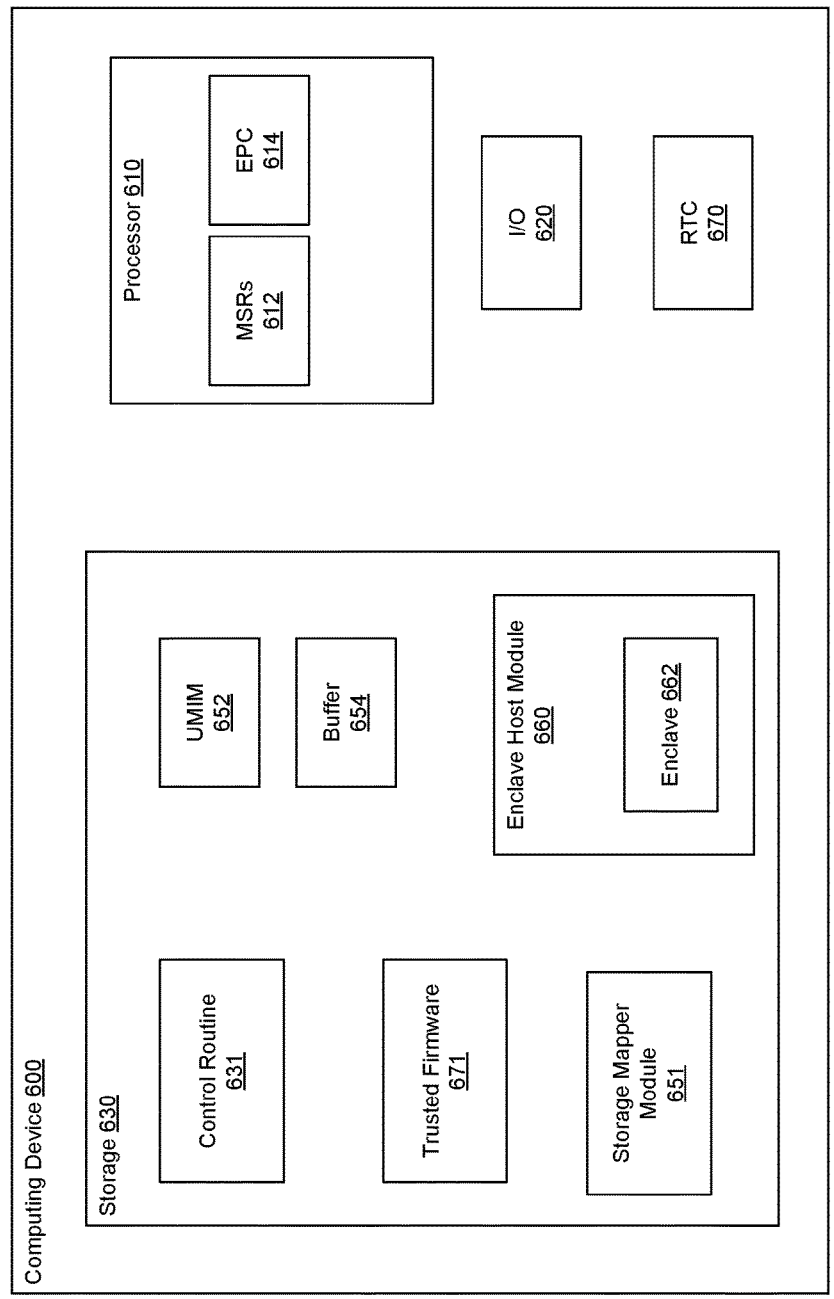
FIG. 6 is a block diagram of a computing device in which embodiments of the invention may be used.

FIG. 6 depicts components of the system architecture of one example embodiment of a computing device that is configured to implement a trusted time service consistent with the present disclosure. As shown, computing device 600 includes processor 610, input output interface (I/O) 620, storage 630, and real-time clock (RTC) 670. Such components may be communicatively coupled to one another in any suitable manner, such as via a bus or other suitable communications medium (not shown). Various components such as physical (e.g., random access) memory, displays, etc. that may be commonly found in modern computing devices have been omitted from FIG. 6 for the sake of clarity.

Computing device 600 may be any type of computing device that is suitable for providing a trusted time service at least in part with a secure enclave. Examples of such devices are enumerated above, and so are not reiterated. Regardless of its form factor, computing device 600 is generally configured to enable the use of a secure enclave running in user mode to obtain a trusted timestamp. It should be understood that while FIG. 6 depicts a single computing device 600 that is configured in this manner, the various operations and components described herein may be incorporated and/or implemented among a plurality of computing devices.

Processor 610 may be any suitable general purpose processor or application specific integrated circuit, and may be capable of executing one or multiple threads on one or multiple processor cores. Without limitation, in some embodiments, processor 610 is a general purpose processor, such as but not limited to the general purpose processors commercially available from Intel® Corp., Advanced Micro Devices®, ARM®, NVIDIA®, Apple®, and Samsung®. While FIG. 6 illustrates computing device 100 as including a single processor, multiple processors including one or multiple processing cores may be used. Without limitation, processor 610 in some embodiments is a past, present or future produced single or multicore Intel® processor.

Regardless of its type, processor 610 may be configured to provide different modes of operation, referred to as "kernel mode" and "user mode." Processor 610 may switch between kernel and user mode based on the privilege level of an application that it is executing or is to execute. In general, applications that may be used to initialize and provide interface functionality to components of the computing device (e.g., drivers, operating system (OS) components, pre-boot applications, or the like) have kernel level privileges and therefore operate in kernel mode. That is, processor 610 is configured to operate in kernel mode when executing those types of applications. In contrast, most other applications have user level privileges and therefore processor 610 is configured to operate in user mode when executing such applications.

As further shown in FIG. 6, processor 610 may include one or more model specific registers (MSRs 612), a secure enclave page cache (EPC) 614, and a trusted execution environment (TEE) support 616. As processor 610 executes control routine 631, it may set one or more MSRs 612 to enable switching between user mode and kernel mode operation. For example, one or more MSRs 612 may be set to enable SYSCALL/SYSRET instructions, which can switch processor 610 between user mode and kernel mode.

In some embodiments, a part of or the entirety of a secure enclave, such as secure enclave 662 of FIG. 6, may be stored in a specialized memory structure such as an enclave page cache (EPC). While FIG. 1 depicts EPC 614 as being included in processor 610, EPC 614 may be present in another component of computing device 600, such as but not limited to storage 630, platform local memory (e.g., DRAM and the like), memory accessible by a basic input output system (BIOS), and the like. In some embodiments, EPC 614 is stored in a cryptographically protected region of platform local memory of computing device 600. In other embodiments, EPC 614 is stored in a cryptographically protected region of storage 630. In still further embodiments, EPC 614 is stored in a cryptographically protected region of a BIOS accessible memory.

The illustrative processor 610 includes trusted execution environment (TEE) support 616. The TEE support 616 allows the processor 110 to establish a software execution environment in which executing code may be measured, verified, or otherwise determined to be authentic. Additionally, code and data included in the software TEE may be encrypted or otherwise protected from being accessed by code executing outside of the software TEE. In some embodiments, the TEE support 616 may be embodied as Intel® Software Guard Extensions (SGX) technology. Intel® SGX technology may be embodied as a set of processor instruction extensions that allow the processor 610 to establish one or more secure enclaves, such as enclave 662, in a memory. Secure enclaves may be embodied as regions of memory including software that are isolated from other software executed by the processor 610.

Similar to the TEE, the contents of the secure enclave 662 may be protected from access by software executing outside of the same secure enclave 662 (even from other secure enclaves executing on the same device 600). The contents of each secure enclave 662 may be protected from access and/or tampering using any combination of hardware protection and/or cryptographic protection.

I/O 620 may include hardware (i.e., circuitry), software, or a combination of hardware and software that is configured to allow computing device 600 to transmit and receive data among its respective components, and optionally to one or more external devices. Such communication may occur over a wired or wireless connection using a close and/or long range communications network. I/O 620 may therefore include hardware to support such communication, e.g., one or more transponders, antennas, BLUETOOTH™ chips, personal area network chips, near field communication chips, network interface cards, combinations thereof, and the like.

Storage 630 may be any suitable storage device or combination of storage devices, such as those noted above. Without limitation, in some embodiments storage 630 is in the form or one or more magnetic hard drives, solid state drives (SSD), smart cards, universal serial bus (USB) drives, memory sticks, combinations thereof, or the like. As shown, storage 630 may store one or more of control routine 631, storage mapper module 651, user mode interface module (UMIM) 652, buffer 654, enclave host module 660, and secure enclave 662. It should be understood that while buffer 654, enclave host module 660, and secure enclave 662 are depicted as being stored on storage 630, such an implementation is not required. Indeed, such components may be implemented in any suitable memory and memory location, such as but not limited to memory local to processor 610 (e.g., processor cache memory), system physical memory (e.g., DRAM), combinations thereof, and the like.

Control routine 631 includes a sequence of instructions that are operative on processor 610 to implement logic to perform various functions. For example, in executing control routine 631, processor 610 may provide kernel mode support for kernel mode components such as storage mapper module 651, and UMIM 652. In addition, execution of control routine 631 by processor 610 may provide user mode support for user mode components such as enclave host module 660, enclave 662, and other user mode applications (not shown in FIG. 6). As will be described in detail later, UMIM 652 may serve as a conduit for directing data (e.g., from one or more user mode applications) to buffer 654, such that the data is available for operations performed by enclave 662. In addition, in some embodiments UMIM 652 may be configured to cause computing device 600 (or, more particularly, processor 610) to establish a proxy (not shown in FIG. 6) that may be leveraged to enable communication between UMIM 652 (a kernel mode application) and enclave host most 660 (a user mode application).

In various embodiments control routine 631 may include one or more of an operating system (OS), device drivers and/or application-level routines (e.g., so-called "software suites" provided on disc media, "applets" obtained from a remote server, etc.). Where an operating system is included, the operating system may be any of a variety of available operating systems appropriate for computing device 600 and/or processor 610, such as but not limited to a Microsoft® Windows® operating system, MAC® OS®, a LINUX® operating system, an Android® operating system, a UNIX® operating system, or any other operating system for a mobile or other electronic device. Where one or more device drivers are included, those device drivers may provide support for any of a variety of other components, whether hardware or software components of the computing device 600.

In some embodiments, control routine 631 (or some component thereof) may operate to create secure enclave 662. For example, control routine 631 may include a kernel mode driver that creates secure enclave 662. The kernel mode driver may create secure enclave 662 in any suitable manner, such as by allocating at least one memory page to EPC 614, and extending an enclave image into the location of the allocated memory page(s). If desired, the enclave may then be transferred to enclave host module 660, e.g., by performing a mapping operation to map the memory pages within EPC 614 allocated to enclave 662 to enclave host module 660.

Enclave 662 need not be created by control routine 631. Indeed, in some embodiments of the present disclosure enclave 662 may be created and/or instantiated in a pre-boot phase of computing device 600, e.g., prior to the execution of components of control routine 631 that may be needed to boot computing system 600. For example the enclave may be established by a BIOS boot loader or other BIOS application, e.g., prior to loading various components of control routine 631. Creating enclave 662 in this manner may be particularly useful when all or a portion of control routine 631 has been encrypted by an enclave, e.g., when computing device 600 is shut down.

Storage mapper module 651 may be in the form of hardware, software, or a combination of hardware and software that is generally configured to route data that is to be operated upon by a secure enclave to UMIM 652. For example, and as will be described in detail later, storage mapper module 651 may be configured to route data (e.g., from a user mode application, not shown in FIG. 6) to UMIM 652.

For the sake of illustration, storage mapper module 651 is described herein as an independent component that operates to route data in the manner just described. However it should be understood that storage mapper module 651 need not be implemented in that manner. For example, storage mapper module may be implemented as part of or in conjunction with the storage stack (not shown) of storage 630. It will be appreciated that the nature and characteristics of the storage stack may differ depending on the nature of control routine 631, or more particularly, the type of operating system that is being executed on computing device 600. For example in the context of the LINUX® operating system, storage mapper module 651 may be implemented in the context of the DeviceMapper framework, which is the Linux mechanism for mapping physical block devices to higher level virtual block devices, and is used in connection with the LINUX kernel mode disk encryption subsystem known as "dm-crypt." Of course, other implementations are possible and would be readily understood by those of skill in the art. Regardless of the particular implementation, it should be understood that storage mapper module 651 is generally configured to route data to UMIM 652, as previously described.

Buffer 654 may be configured such that it may be accessible by kernel and user mode applications that may be executed on processor 610. Buffer 654 may therefore be understood as a "shared" buffer that can be written to and read from by kernel and user mode applications. For example in some embodiments UMIM 652 may write or cause data to be written to buffer 654, after which that data may be read from buffer 654 by enclave host module 660 (or, more specifically, enclave 662). Enclave 662 may process the data, producing "processed" data that may then be written to buffer 654. UMIM 652 may then retrieve the processed data from buffer 654 and direct it to other components of computing device 600, e.g., storage mapper module 651, as will be explained in further detail with regard to FIG. 7.

Buffer 654 may be any suitable type of shared buffer. Without limitation, in some embodiments, buffer 654 is in the form of a ring (circular) buffer. As will be appreciated, a ring buffer may be a data structure that uses a single fixed size buffer as if it were connected end to end, such that the buffer has a first in, first out (FIFO) characteristic. In such instances UMIM 652 may write data into buffer 654 for processing by enclave 662, which may process the data as discussed previously.

Enclave 662, in some embodiments, may perform operations on data in buffer 654 "in place," i.e., such that the resulting processed data is maintained at the same location within buffer 654 as the (unprocessed) data. UMIM 652 may then read the processed data from buffer 654 as discussed previously, e.g., on a FIFO basis. This process may be facilitated, for example, by executing UMIM 652 and enclave host module 660 on different threads of processor 610. For example, as UMIM 652 reads processed data from buffer 654, UMIM 652 may replace that data with additional (unprocessed) data (if needed). The additional data may then be read by enclave host module 660 and operated upon by enclave 662, as discussed above. Put in other terms, UMIM 652 may operate to fill buffer 654 with unprocessed data as enclave host module 660 drains unprocessed data from buffer 654 and provides the unprocessed data to enclave 662 for the execution of enclave operations. Likewise, enclave host module 660 may fill the buffer 654 with processed data as UMIM 652 reads processed data from buffer 654 and provides it to storage mapper module 651. This process may allow a single activation of enclave 662 (e.g., execution of a single EENTER instruction to pass control to enclave 662) to perform operations on a large amount of data and/or a plurality of smaller batches of data before enclave 662 is deactivated (e.g., before execution of an EEXIT instruction). This process can potentially reduce the overhead associated with repeated entry and exit from enclave 662, particularly when workload is high.

As noted previously, enclave 662 may be hosted by enclave host module 660. In general, enclave host module 660 may include hardware, software, or a combination of hardware and software that is configured to manage the operation of enclave 662. For example, in some embodiments, enclave host module 660 may be configured as a disk or other service that may be executed within the context of control routine 631. In some embodiments, enclave host module 660 may be a user mode application and/or service which may receive an indication from one or more kernel mode applications (e.g., UMIM 652) that causes enclave 662 to run. For example, in some embodiments, enclave host module 660 may receive a buffered data indication from UMIM 652, signifying that data is present in buffer 654. In response to the buffered data indication, enclave host module 660 may cause enclave 662 to run, e.g., by executing or causing the execution of an EENTER instruction that passes control to enclave 662. Enclave 662 may then process data in buffer 654, as generally described above. Of course, other mechanisms for controlling the operation of enclave 662 are possible, and are envisioned by the present disclosure.

The buffered data indication may be provided in any suitable manner. In some embodiments, UMIM 652 may be configured to provide the buffered data indication to enclave host module 660. In instances where UMIM 652 and enclave host module 660 may communicate directly with one another, for example, UMIM 652 may issue a message containing the buffered data indication to enclave host module 660. In many contexts, however it may not be possible for UMIM 652 (a kernel mode component) to communicate directly with enclave host module 660 (a user mode component). In such instances UMIM 652 and enclave host module 660 may be configured to communicate with one another via a proxy.

For example enclave host module 660 may be configured to issue a call (e.g., a read command) directed to a kernel mode proxy. The kernel mode proxy may be established by UMIM 652 or some other component of computing device 600, such as storage mapper module 651. The kernel mode proxy may be or include a file or other data structure that may be exposed to a user mode application. For example, in instances where control routine 131 is a LINUX operating system, the proxy may be set up as a miscellaneous device, which may result in the creation of a file or other data structure that may be accessible by enclave host module 660. In such instances, enclave host module 660 may be configured to issue a system call (e.g., a read command) directed towards the proxy (or, more particularly, a file or other data structure associated with the proxy), as discussed above.

With this in mind, UMIM 652 in some embodiments may be configured to intercept the system call issued by enclave host module 660, and to hold that call until data is present in buffer 654. When data is present in buffer 654, UMIM 652 may release the system call. The release of the system call may be understood by enclave host module 660 as a buffered data indication signifying that data is present in buffer 654. Enclave host module 660 may then activate enclave 662 (e.g., by causing the execution of an EENTER instruction). Enclave 662 may then process data in buffer 654, as previously described, until no (unprocessed) data remains in buffer 654. At that time, enclave host module 660 may issue another system call (e.g., a read command) targeting the proxy (or, more particularly, a file or other data structure associated with the proxy). Like the prior system call, the additional system call issued by enclave host module 662 may be intercepted by UMIM 652 and held until data is present in buffer 654. Depending on the application, enclave 662 may be disabled (e.g., it may release control by the execution of an EEXIT instruction) immediately upon the issuance of a system call while enclave 662 is active, after the expiration of a threshold period of time, or in response to the fulfillment of some other criteria.

Storage 630 also includes trusted firmware 671 to communicate directly with hardware such as real-time clock (RTC) 670. In one embodiment, trusted firmware 671 is embodied as Intel® Software Guard Extensions (SGX) trusted firmware, such as a microcode-exclusive hardware endpoint provided via SGX. The role of trusted firmware 671 is described in more detail below.

Figure 7:
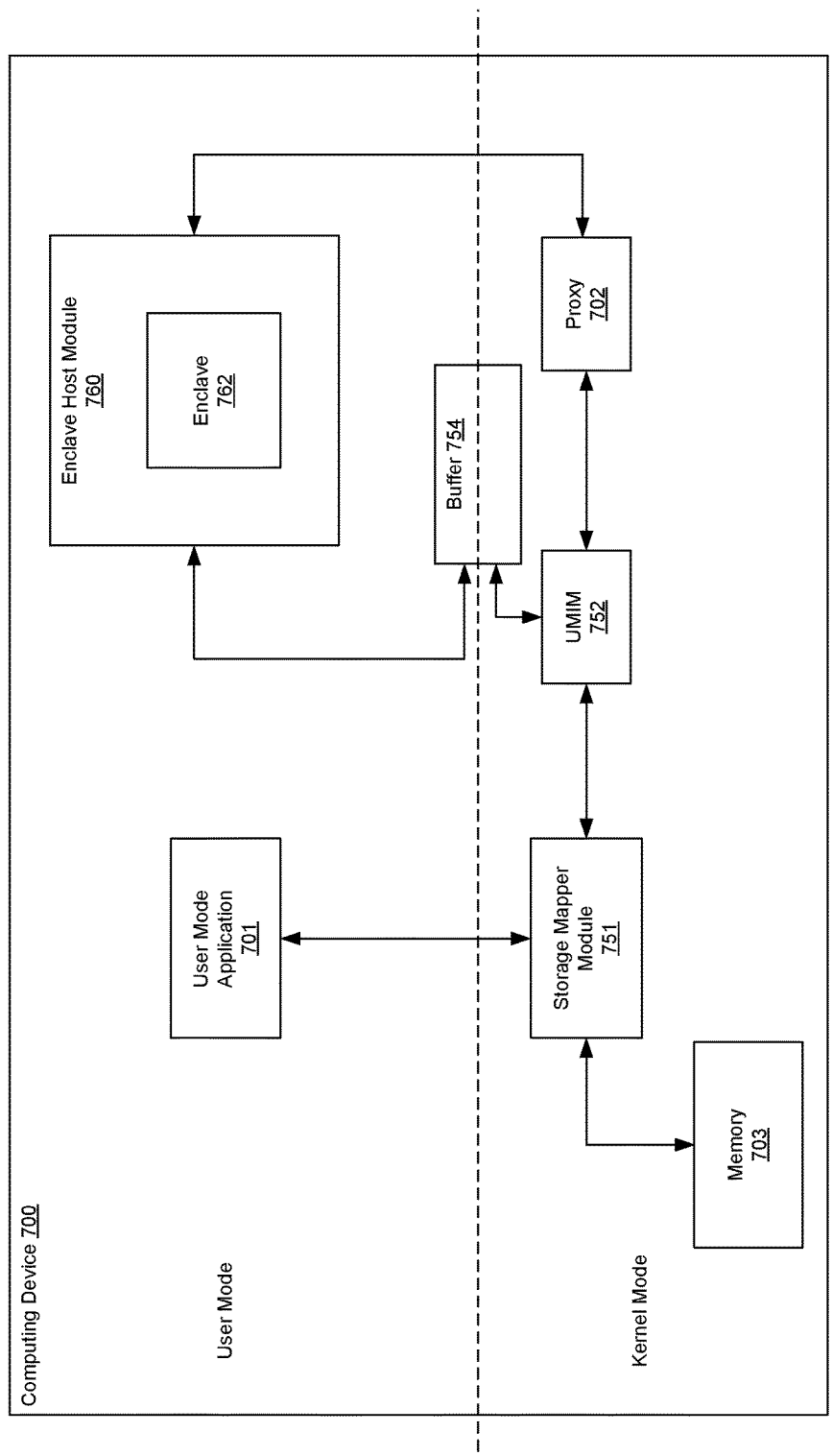
FIG. 7 is a block diagram of an operating environment of the computing device of FIG. 6.

To further explain the technologies of the present disclosure, reference is now made to FIG. 7, which is a block diagram illustrating the interaction of various components of computing device 700 associated with the processing of data by a secure enclave. In particular, FIG. 7 depicts which of the various components of computing device 700 may operate in user mode and kernel mode, and the respective interactions between such components. For the sake of illustration, operations that may be performed by the components of FIG. 2 will be described in a use case in which computing system 700 (or, more particularly, enclave 762) is configured to implement a trusted time service.

With the foregoing in mind, FIG. 7 depicts computing device 700 as including many of the same components that were described above in connection with FIG. 6; i.e., storage mapper module 751, UMIM 752, buffer 754, enclave host module 760, and enclave 762 have respective counterparts in FIG. 6. The nature of such components is therefore not described again. In addition, FIG. 7 depicts computing device 700 as including memory 703, user mode application 701, and proxy 702.

In some embodiments, memory 703 is non-volatile memory that may be local to or remote from storage 630 of FIG. 6. Without limitation, in some embodiments, memory 703 is local to storage 630 of FIG. 6. In the course of operation, user mode application 701 may cause computing device (or some component thereof) to issue a read request targeting data that is stored in memory 703. For example, in some embodiments user mode application 701 may issue a read request to storage mapper module 751, which may interact with or be integral to the storage stack of a control routine executing on computing device 700. In any case, storage mapper module 751 may issue or cause the issuance of a read command to memory 703. The read command may be configured to cause data stored at the relevant portions of memory 703 to be read out and provided to storage mapper module 751. In response to receiving the data from memory 703, storage mapper module 751 may be configured to relay the data to UMIM 752, as generally described above.

Alternatively or additionally, in the course of operation user mode application 701 may cause computing device or some component thereof to issue a write request to write data to memory 703. For example, in some embodiments, user mode application 701 may issue a write request to storage mapper module 751. Storage mapper module 751 may be configured to forward the data associated with the write request to UMIM 752, in the same manner as generally described above.

In response to receiving data from storage mapper module 751, UMIM 752 may queue all or a portion of the data to buffer 754. As mentioned above, buffer 754 may be in the form of a shared buffer (e.g., a ring buffer) that may be accessed by UMIM 752 and user mode applications, such as enclave host module 760. Simultaneously or subsequent to queuing data in buffer 754, UMIM 752 may provide a buffered data indicator to indicate to enclave host module 760 that data is present in buffer 754. As explained previously, in some embodiments, UMIM 752 may provide the buffered data indicator to enclave host module 760 at least in part by releasing a system call (e.g., read request) targeting a proxy, e.g., proxy 702.

As noted above, proxy 702 may be in the form of a kernel mode device (or associated data structure) that may be exposed to user mode applications, such as enclave host module 760. Proxy 702 may be created in any suitable manner, and by any suitable component of computing device 700. For example, a storage mapper module and/or a UMIM may cause the creation of proxy 702, e.g., by processor 601 of FIG. 6. Without limitation, in some embodiments, proxy 702 may be established when storage mapper module 751 is enabled (e.g., loaded), UMIM 752 is enabled (e.g., loaded), or both. In any case, enclave host module 760 may issue a system call targeting proxy 702. UMIM 752 may intercept that system call and hold it until data is present in buffer 754. Once data is queued in buffer 754, UMIM 752 may release the system call, thereby providing a buffered data indicator to enclave host module 760 that signifies that data is present in buffer 754. Of course, releasing a system call targeting proxy 702 is just one example of how UMIM 752 may indicate the presence of data in buffer 754 to enclave host module 760. Other methods of providing a buffered data indicator are possible, as would be understood by one of ordinary skill in the art.

In response to receiving a buffered data indicator, enclave host module 760 may pass control to enclave 762, e.g., by causing the execution of an EENTER instruction or other suitable command. Enclave 762 may then perform enclave operations on the data in buffer 754. The resulting processed data may then be written to buffer 754. In some embodiments, the processed data is written to the same location (address) in buffer 754 as its corresponding (unprocessed) data. In such instances, enclave 762 may be considered to perform enclave operations "in place."

When all of the data in buffer 754 has been processed, enclave host module 760 (or, more specifically, enclave 762) may request additional data for processing. In some embodiments enclave host module 760 may signify that it has completed processing data in buffer 754, e.g., by providing a completion indicator to UMIM 752. Enclave host module 760 may provide the completion indicator in any suitable manner, such as but not limited to issuing another system call targeting proxy 702. Alternatively or additionally, enclave host module 760 could be configured to issue a read or write request targeting an address (e.g., a virtual address) where no page is mapped, resulting in a page fault. In such instances UMIM 752 may be configured to monitor for such a fault, and to interpret such a fault as a completion indicator. In any case, in some embodiments the completion indicator may also indicate to UMIM 752 that additional data is being requested by enclave host module 760.

Of course, the above techniques are just a few examples of how UMIM 752 may determine that enclave 762 has completed processing of data in buffer 754. Other methods are possible, as would be understood by those of skill in the art.

In instances where the completion indicator is in the form of a system call targeting the proxy, UMIM 752 may in response to the completion indicator convey the processed data in buffer 754 to storage mapper module, which may in turn provide it to memory 703 or user mode application 701, as appropriate. In addition, UMIM 752 may also make a determination as to whether additional data is available for processing by enclave 762. If so, UMIM 752 may queue additional data in buffer 754 and release the system call targeting proxy 200 (or a data structure associated therewith), thereby providing another buffered data indicator to enclave host module 760 and signifying that additional data is present in buffer 754. This process may continue until enclave 762 has processed all of the data associated with the read/write request issued by user mode application 701.

In any case, UMIM 752 may convey processed data 752 from buffer 754 to storage mapper module 751. Storage mapper module 751 may convey the processed data to user mode application 701 or another component of computing device 700, as desired.

Figure 8:
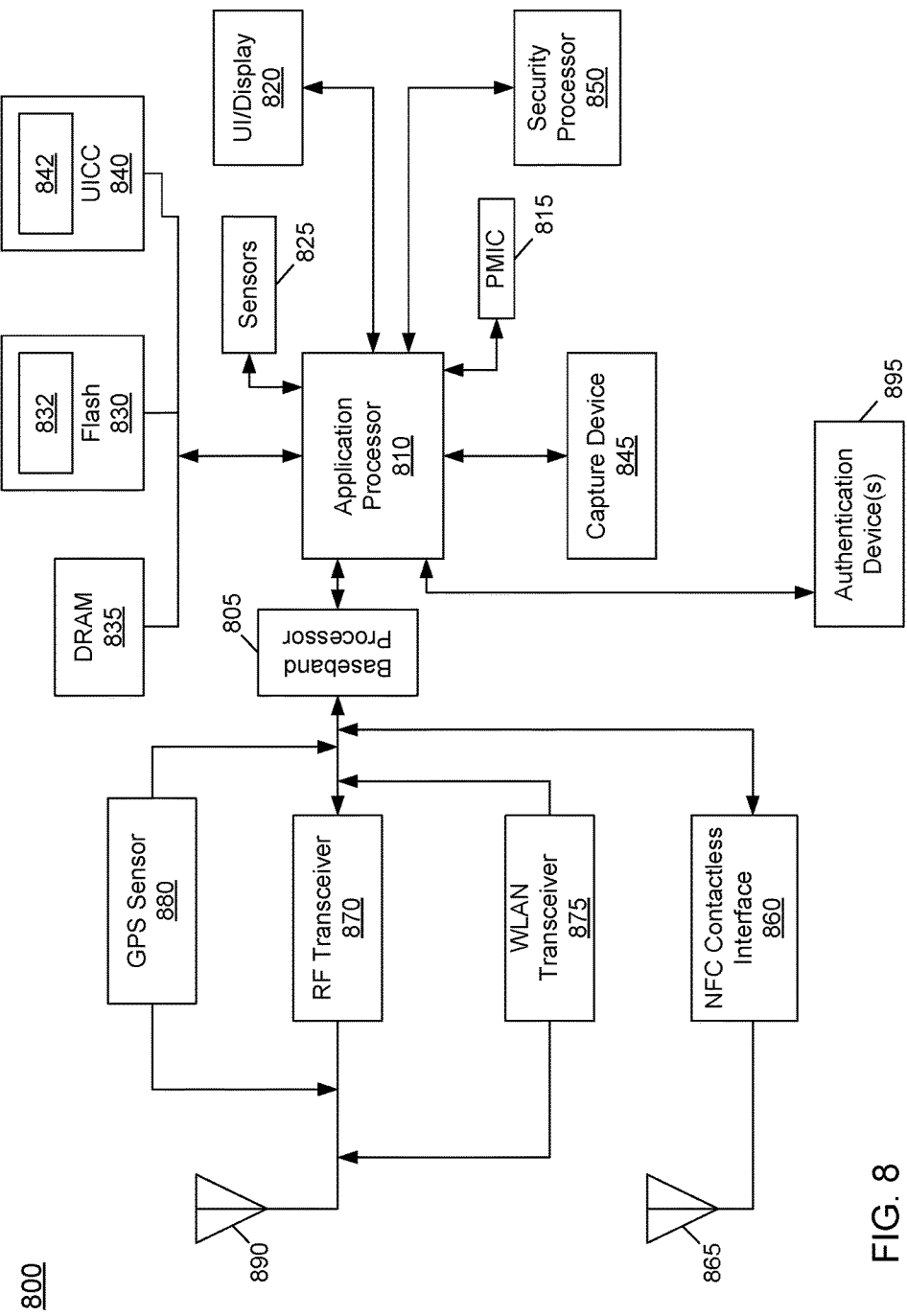
FIG. 8 is a diagram showing a system that can be used to implement an embodiment.

Referring now to FIG. 8, shown is a block diagram of an example system with which embodiments can be used. As seen, system 800 may be a smartphone or other wireless communicator or any other IoT device. In different examples, system 800 may be configured to perform the platform services enclave and time-related functions described herein. A baseband processor 805 is configured to perform various signal processing with regard to communication signals to be transmitted from or received by the system. In turn, baseband processor 805 is coupled to an application processor 810, which may be a main CPU of the system to execute an OS and other system software, in addition to user applications such as many well-known social media and multimedia apps. Application processor 810 may further be configured to perform a variety of other computing operations for the device.

In turn, application processor 810 can couple to a user interface/display 820, e.g., a touch screen display. In addition, application processor 810 may couple to a memory system including a non-volatile memory, namely a flash memory 830 and a system memory, namely a DRAM 835. In some embodiments, flash memory 830 may include a secure portion 832 in which keys, other secrets and other sensitive information may be stored and operated. One or more of these storages may store a package for performing the privilege delegation protocols described herein. As further seen, application processor 810 also couples to a capture device 845 such as one or more image capture devices that can record video and/or still images.

Still referring to FIG. 8, a universal integrated circuit card (UICC) 840 comprises a subscriber identity module, which in some embodiments includes a secure storage 842 to store secure identity information. System 800 may further include a security processor 850 that may that may implement a trusted execution environment (TEE), and which may couple to application processor 810. Furthermore, application processor 810 may implement a secure mode of operation, such as Intel® Software Guard Extensions (SGX) to a given instruction set architecture, and circuitry for hosting of a TEE. Security processor 850 and/or application processor 810 may be configured to participate in the platform services enclave and time-related functions described herein. A plurality of sensors 825, including one or more multi-axis accelerometers may couple to application processor 810 to enable input of a variety of sensed information such as motion and other environmental information. In addition, one or more authentication devices 895 may be used to receive, e.g., user biometric input for use in authentication operations.

As further illustrated, a near field communication (NFC) contactless interface 860 is provided that communicates in a NFC near field via an NFC antenna 865. While separate antennae are shown in FIG. 8, understand that in some implementations one antenna or a different set of antennae may be provided to enable various wireless functionality.

A power management integrated circuit (PMIC) 815 couples to application processor 810 to perform platform level power management. To this end, PMIC 815 may issue power management requests to application processor 810 to enter certain low power states as desired. Furthermore, based on platform constraints, PMIC 815 may also control the power level of other components of system 800.

To enable communications to be transmitted and received such as in one or more IoT networks, various circuitry may be coupled between baseband processor 805 and an antenna 890. Specifically, a radio frequency (RF) transceiver 870 and a wireless local area network (WLAN) transceiver 875 may be present. In general, RF transceiver 870 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 880 may be present, with location information being provided to security processor 850, which may be used in certain security operations. Other wireless communications such as receipt or transmission of radio signals, e.g., AM/FM and other signals may also be provided. In addition, via WLAN transceiver 875, local wireless communications, such as according to a Bluetooth™ or IEEE 802.11 standard can also be realized.

Figure 9:
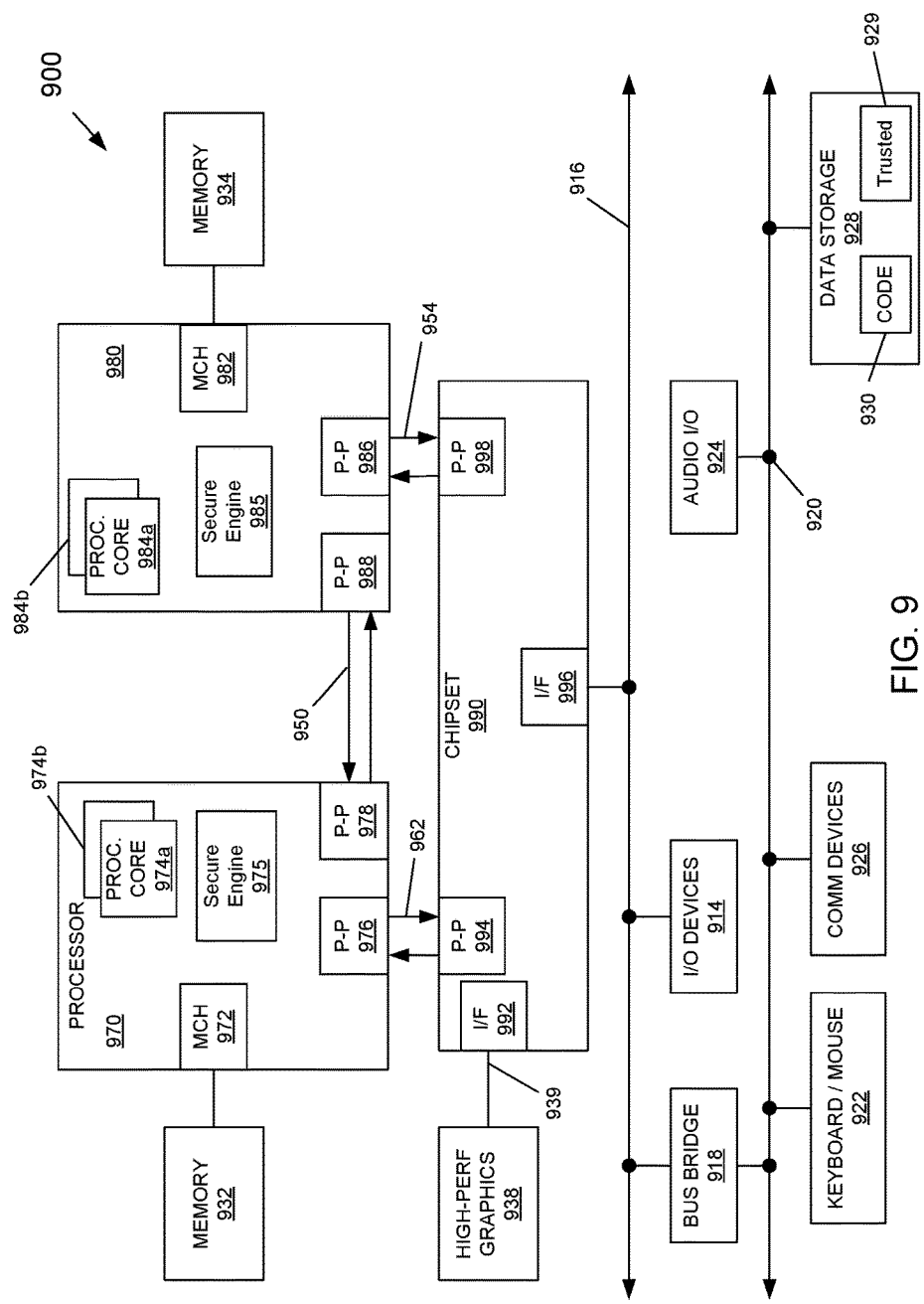
FIG. 9 is a diagram showing a system that can be used to implement an embodiment.

Referring now to FIG. 9, shown is a block diagram of a system in accordance with another embodiment of the present invention. As shown in FIG. 9, multiprocessor system 900 may perform the platform services enclave and time-related functions described herein, and can be implemented as a point-to-point interconnect system such as a server system. System 900 includes a first processor 970 and a second processor 980 coupled via a point-to-point interconnect 950. As shown in FIG. 11, each of processors 970 and 980 may be multicore processors such as SoCs, including first and second processor cores (i.e., processor cores 974a and 974b and processor cores 984a and 984b), although potentially many more cores may be present in the processors. In addition, processors 970 and 980 each may include a secure engine 975 and 985 to perform the platform services enclave and time-related functions as described herein.

Still referring to FIG. 9, first processor 970 further includes a memory controller hub (MCH) 972 and point-to-point (P-P) interfaces 976 and 978. Similarly, second processor 980 includes a MCH 982 and P-P interfaces 986 and 988. As shown in FIG. 9, MCH's 972 and 982 couple the processors to respective memories, namely a memory 932 and a memory 934, which may be portions of main memory (e.g., a DRAM) locally attached to the respective processors. First processor 970 and second processor 980 may be coupled to a chipset 990 via P-P interconnects 952 and 954, respectively. As shown in FIG. 9, chipset 990 includes P-P interfaces 994 and 998.

Furthermore, chipset 990 includes an interface 992 to couple chipset 990 with a high performance graphics engine 938, by a P-P interconnect 939. In turn, chipset 990 may be coupled to a first bus 916 via an interface 996. As shown in FIG. 9, various input/output (I/O) devices 914 may be coupled to first bus 916, along with a bus bridge 918 which couples first bus 916 to a second bus 920. Various devices may be coupled to second bus 920 including, for example, a keyboard/mouse 922, communication devices 926 and a data storage unit 928 such as a non-volatile storage or other mass storage device. As seen, data storage unit 928 may include code 930, in one embodiment, including code for performing the platform services enclave and time-related functions described herein. As further seen, data storage unit 928 also includes a trusted storage 929 to store sensitive information to be protected. Further, an audio I/O 924 may be coupled to second bus 920.

Figure 10:
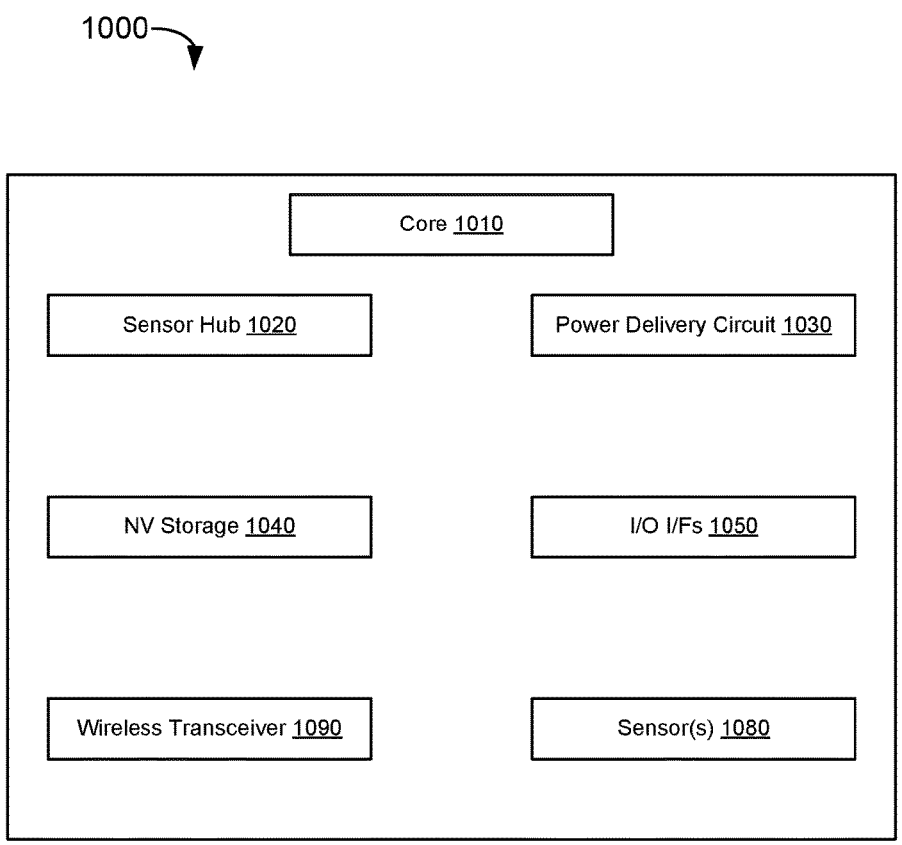
FIG. 10 is a diagram showing a system that can be used to implement an embodiment.

Embodiments may be used in environments where IoT devices may include wearable devices or other small form factor IoT devices such as an actuator and/or sensor. Referring now to FIG. 10, shown is a block diagram of a module 1000 in accordance with another embodiment. In one particular implementation, module 1000 may be an Intel® Curie™ module that includes multiple components adapted within a single small module. Module 1000 may be configured to perform platform services enclave and time-related functions with minimal overhead, as described herein. As seen, module 1000 includes a core 1010 (of course in other embodiments more than one core may be present). Such core may be a relatively low complexity in-order core, such as based on an Intel Architecture® Quark™ design. In some embodiments, core 1010 may implement a TEE as described herein. Core 1010 couples to various components including a sensor hub 1020, which may be configured to interact with a plurality of sensors 1080, such as one or more biometric, motion environmental or other sensors. A power delivery circuit 1030 is present, along with a non-volatile storage 1040. In an embodiment, this circuit may include a rechargeable battery and a recharging circuit, which may in one embodiment receive charging power wirelessly. One or more input/output (IO) interfaces 1050, such as one or more interfaces compatible with one or more of USB/SPI/I2C/GPIO protocols, may be present. In addition, a wireless transceiver 1090, which may be a Bluetooth™ low energy or other short-range wireless transceiver is present to enable wireless communications as described herein. Understand that in different implementations an IoT module can take many other forms, that have, in comparison with a typical general purpose CPU or a GPU, a small form factor, low power requirements, limited instruction sets, relatively slow computation throughput, or any of the above.

The following Examples pertain to further embodiments.

In Example 1, a system comprises a processor; a memory coupled to the processor, where the memory is configured to establish a trusted execution environment in which a secure enclave may execute, and the trusted execution environment is inaccessible by an operating system for the system; and a real-time clock configured to provide a current timestamp only in response to receiving a microcode instruction to get the current timestamp.

In Example 2, the system further comprises a platform services enclave configured to execute within the trusted execution environment, where the platform services enclave is configured to call the microcode instruction to get the current timestamp from the real-time clock.

In Example 3, the real-time clock is configured to execute the microcode instruction only if the call to the microcode instruction is received from the platform services enclave.

In Example 4, the platform services enclave is further configured to determine whether the real-time clock has been reset.

In Example 5, the platform services enclave is further configured to issue a second microcode instruction to reinitialize the real-time clock if the platform services enclave determines that the real time clock has been reset.

In Example 6, the real-time clock comprises a time counter register; and reinitializing the real-time clock comprises reinitializing the time counter register.

In Example 7, the real-time clock further comprises a time epoch register; and reinitializing the real-time clock comprises reinitializing the time epoch register.

In Example 8, the real-time clock further comprises a status register; and reinitializing the real-time clock comprises reinitializing the status register.

Note that the above processor can be implemented using various means. In an example, the processor comprises a system on a chip (SoC) incorporated in a user equipment touch-enabled device. In another example, a system comprises a display and a memory, and includes the processor of one or more of the above examples.

In Example 9, a method comprises: establishing a platform services enclave as a secure enclave to execute within a trusted execution environment, where the platform services enclave is inaccessible by a host operating system of the computer; issuing a microcode instruction by the platform services enclave, where the microcode instruction is to be executed by a real-time clock to get a current timestamp; determining by the platform services enclave whether the real-time clock has been reset; and providing the current timestamp by the platform services enclave to an application enclave if the real-time clock has not been reset, where the application enclave is a second secure enclave of the trusted execution environment, and the application enclave is inaccessible by the host operating system.

In Example 10, the method further comprises issuing a second microcode instruction by the platform services enclave to the real-time clock to reinitialize the real-time clock if the real-time clock has been reset.

In Example 11, the real-time clock is a microcode-exclusive hardware endpoint such that: the first microcode instruction and the second microcode instruction are executed directly by the real-time clock; and only the platform services enclave can issue the first microcode instruction and the second microcode instruction to the real-time clock.

In Example 12, the platform services enclave is established in response to a time request from the application enclave.

In Example 13, the method further comprises reinitializing the real-time clock by the platform services enclave by synchronizing wall-clock time with a trusted time server.

In Example 14, the method further comprises determining, by the first microcode instruction, whether the first microcode instruction was issued by an associated platform services enclave currently associated with the real-time clock; and ignoring the first microcode instruction if the first microcode instruction was not issued by the associated platform services enclave.

In Example 15, no intermediate code is executed between the platform services enclave and the real-time clock.

In Example 16, only the platform services enclave is authorized to issue the first microcode instruction and the second microcode instruction to the real-time clock.

In Example 17, a computer-readable medium including instructions is to perform the method of examples 9-16.

In another example, a computer-readable medium including instructions is to perform the method of any of the above examples.

In another example, a computer-readable medium including data is to be used by at least one machine to fabricate at least one integrated circuit to perform the method of any of the above examples.

In another example, an apparatus comprises means for performing the method of any of the above examples.

In Example 18, an apparatus to provide a trusted time service comprises means for establishing a platform services enclave as a secure enclave to execute within a trusted execution environment, where the platform services enclave is inaccessible by a host operating system of the computer; means for issuing a microcode instruction to a real-time clock to get a current timestamp; means for determining whether the real-time clock has been reset; and means for providing the current timestamp by the platform services enclave to an application enclave if the real-time clock has not been reset, wherein the application enclave is a second secure enclave of the trusted execution environment, and the application enclave is inaccessible by the host operating system.

In Example 19, the apparatus further comprises means for issuing a second microcode instruction to the real-time clock to reinitialize the real-time clock if the real-time clock has been reset.

In Example 20, the real-time clock is a microcode-exclusive hardware endpoint such that: the first microcode instruction and the second microcode instruction are executed directly by the real-time clock; and only the platform services enclave can issue the first microcode instruction and the second microcode instruction to the real-time clock.

In Example 21, the platform services enclave is established in response to a time request from the application enclave.

In Example 22, the apparatus further comprises means for reinitializing the real-time clock by synchronizing wall-clock time with a trusted time server.

In Example 23, the apparatus further comprises means for determining whether the first microcode instruction was issued by an associated platform services enclave currently associated with the real-time clock; and means for ignoring the first microcode instruction if the first microcode instruction was not issued by the associated platform services enclave.

In Example 24, no intermediate code is executed between the platform services enclave and the real-time clock.

In Example 25, only the platform services enclave is authorized to issue the first microcode instruction and the second microcode instruction to the real-time clock.

In Example 26, an apparatus to provide a trusted time service comprises means to perform the methods of examples 9-16.

Understand that various combinations of the above Examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
a processor;
a memory coupled to the processor, wherein
the memory is configured to establish a trusted execution environment in which a secure enclave may execute; and
the trusted execution environment is inaccessible by an operating system for the system;
a real-time clock configured to provide a current timestamp only in response to receiving a microcode instruction to get the current timestamp; and
a platform services enclave configured to execute within the trusted execution environment, wherein the platform services enclave is configured to call the microcode instruction to get the current timestamp from the real-time clock, wherein the real-time clock is configured to execute the microcode instruction only if the call to the microcode instruction is received from the platform services enclave, and wherein the platform services enclave is further configured to determine whether the real-time clock has been reset.

2. The system of claim 1, wherein
the platform services enclave is further configured to issue a second microcode instruction to reinitialize the real-time clock if the platform services enclave determines that the real time clock has been reset.

3. The system of claim 2, wherein
the real-time clock comprises a time counter register; and
reinitializing the real-time clock comprises reinitializing the time counter register.

4. The system of claim 3, wherein
the real-time clock further comprises a time epoch register; and
reinitializing the real-time clock comprises reinitializing the time epoch register.

5. The system of claim 4, wherein
the real-time clock further comprises a status register; and
reinitializing the real-time clock comprises reinitializing the status register.

6. At least one non-transitory computer-readable medium comprising instructions, that when executed by a processor, cause a computer to:
establish a platform services enclave as a secure enclave to execute within a trusted execution environment, wherein the platform services enclave is inaccessible by a host operating system of the computer;
issue a microcode instruction by the platform services enclave, wherein the microcode instruction is to be executed by a real-time clock to get a current timestamp;
determine by the platform services enclave whether the real-time clock has been reset; and
if the real-time clock has not been reset, provide the current timestamp by the platform services enclave to an application enclave, wherein
the application enclave is a second secure enclave of the trusted execution environment, and
the application enclave is inaccessible by the host operating system.

7. The at least one non-transitory computer-readable medium of claim 6, wherein the instructions further cause the computer to:

if the real-time clock has been reset, issue a second microcode instruction by the platform services enclave to reinitialize the real-time clock.

8. The at least one non-transitory computer-readable medium of claim 7, wherein the real-time clock is a microcode-exclusive hardware endpoint such that:
the first microcode instruction and the second microcode instruction are executed directly by the real-time clock; and
only the platform services enclave can issue the first microcode instruction and the second microcode instruction to the real-time clock.

9. The at least one non-transitory computer-readable medium of claim 7, wherein the platform services enclave reinitializes the real-time clock by synchronizing wall-clock time with a trusted time server.

10. The at least one non-transitory computer-readable medium of claim 7, wherein
the first microcode instruction determines whether the first microcode instruction was issued by an associated platform services enclave currently associated with the real-time clock; and
if the first microcode instruction was not issued by the associated platform services enclave, ignore the first microcode instruction.

11. The at least one non-transitory computer-readable medium of claim 7, wherein
only the platform services enclave is authorized to issue the first microcode instruction and the second microcode instruction.

12. The at least one non-transitory computer-readable medium of claim 6, wherein the platform services enclave is established in response to a time request from the application enclave.

13. The at least one non-transitory computer-readable medium of claim 6, wherein
no intermediate code is executed between the platform services enclave and the real-time clock.

14. A method comprising:
establishing a platform services enclave as a secure enclave to execute within a trusted execution environment, wherein the platform services enclave is inaccessible by a host operating system of a computer;
issuing a microcode instruction by the platform services enclave, wherein the microcode instruction is to be executed by a real-time clock to get a current timestamp;
determining by the platform services enclave whether the real-time clock has been reset; and
providing the current timestamp by the platform services enclave to an application enclave if the real-time clock has not been reset, wherein
the application enclave is a second secure enclave of the trusted execution environment, and
the application enclave is inaccessible by the host operating system.

15. The method of claim 14, further comprising:
issuing a second microcode instruction by the platform services enclave to the real-time clock to reinitialize the real-time clock if the real-time clock has been reset.

16. The method of claim 15, further comprising:
reinitializing the real-time clock by the platform services enclave by synchronizing wall-clock time with a trusted time server.

17. The method of claim 14, further comprising:
determining, by the first microcode instruction, whether the first microcode instruction was issued by an associated platform services enclave currently associated with the real-time clock; and
ignoring the first microcode instruction if the first microcode instruction was not issued by the associated platform services enclave.

* * * * *